Jan. 11, 1966 P. K. TRIMBLE 3,228,252
BALANCING SYSTEM
Filed Dec. 5, 1962 4 Sheets-Sheet 4
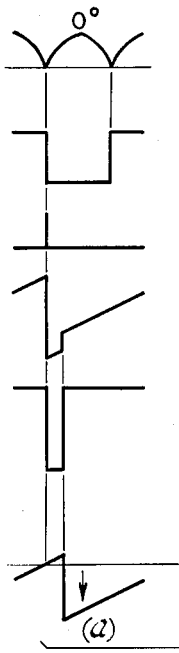
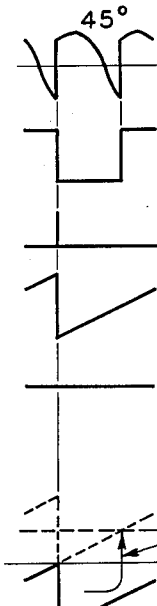
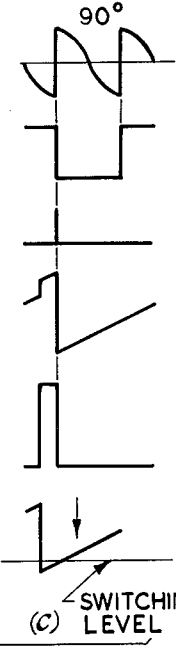
Fig. 9
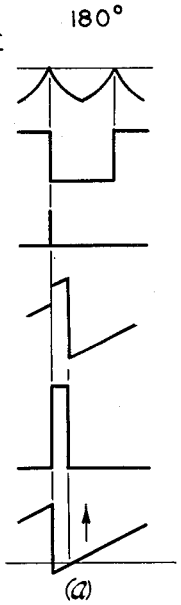
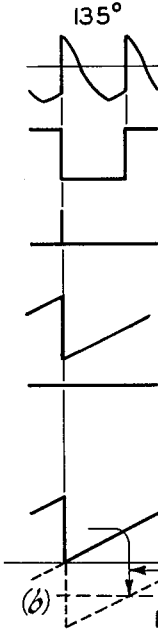
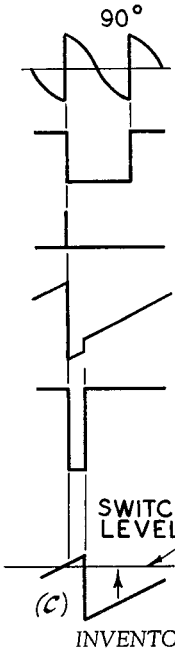
Fig. 10
INVENTOR.
Philip K. Trimble
BY
Hugh L. Fisher
ATTORNEY United States Patent Office 3,228,252
Patented Jan. 11, 1966

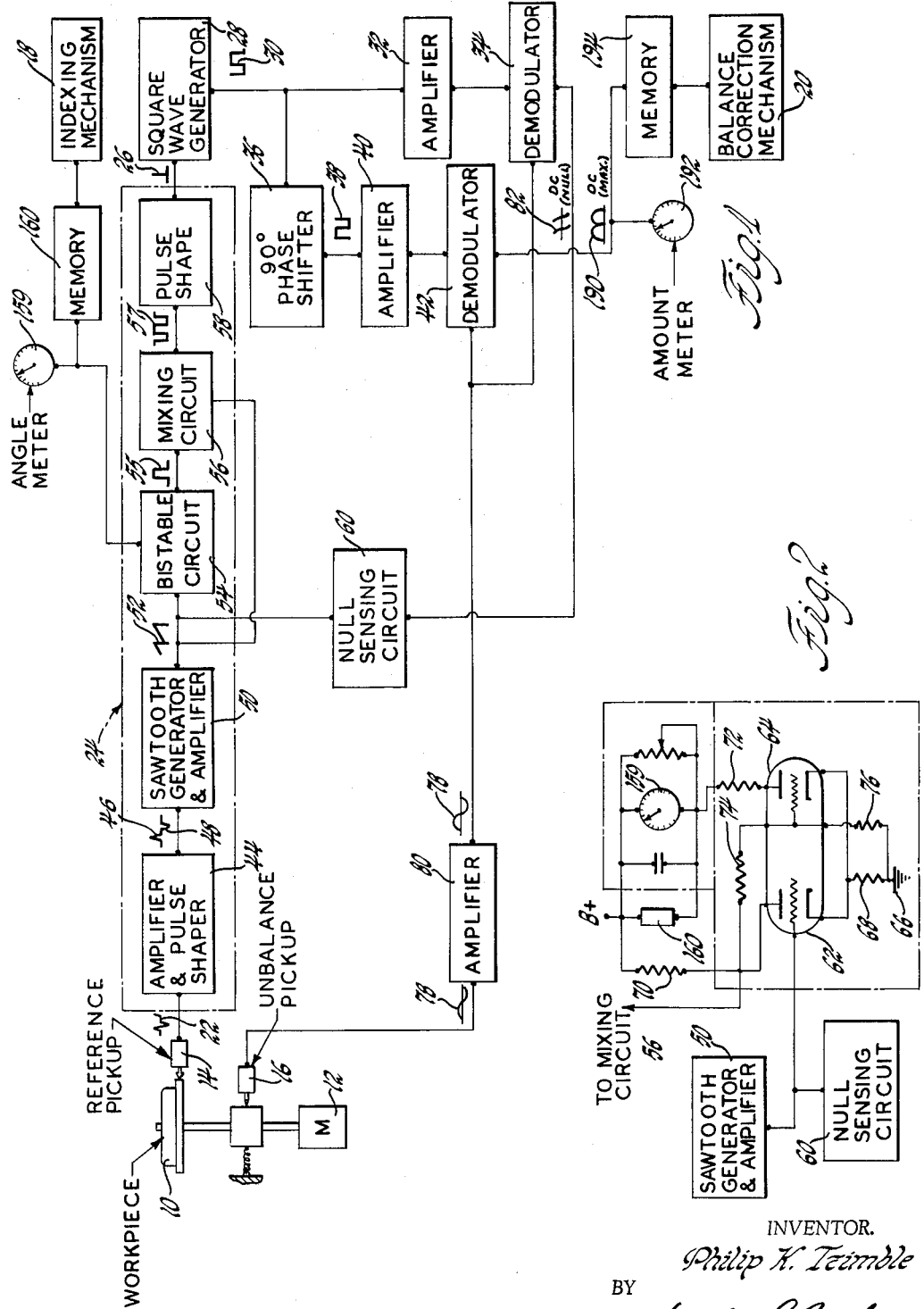

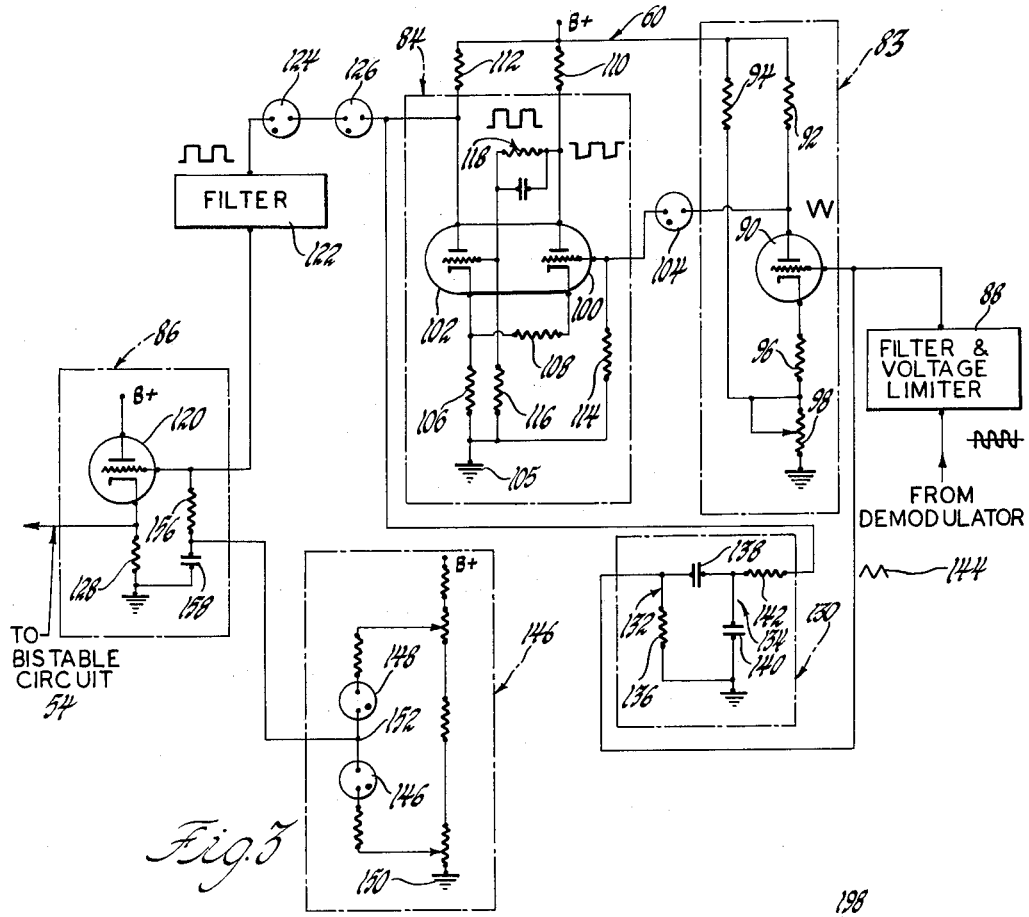
Fig. 3
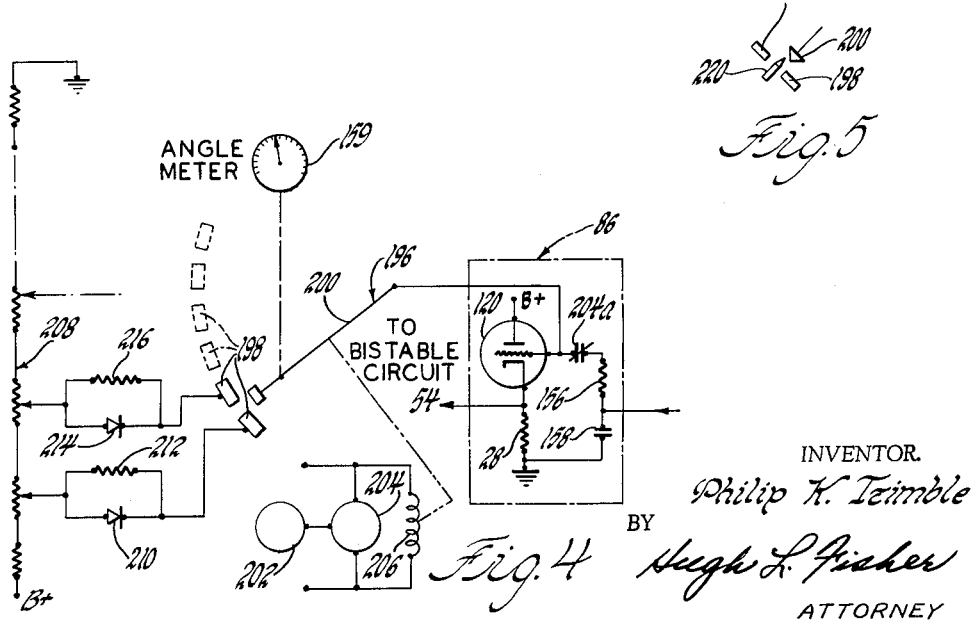
Fig. 5
Fig. 4
INVENTOR.
Philip K. Trimble
BY
Hugh L. Fisher
ATTORNEY

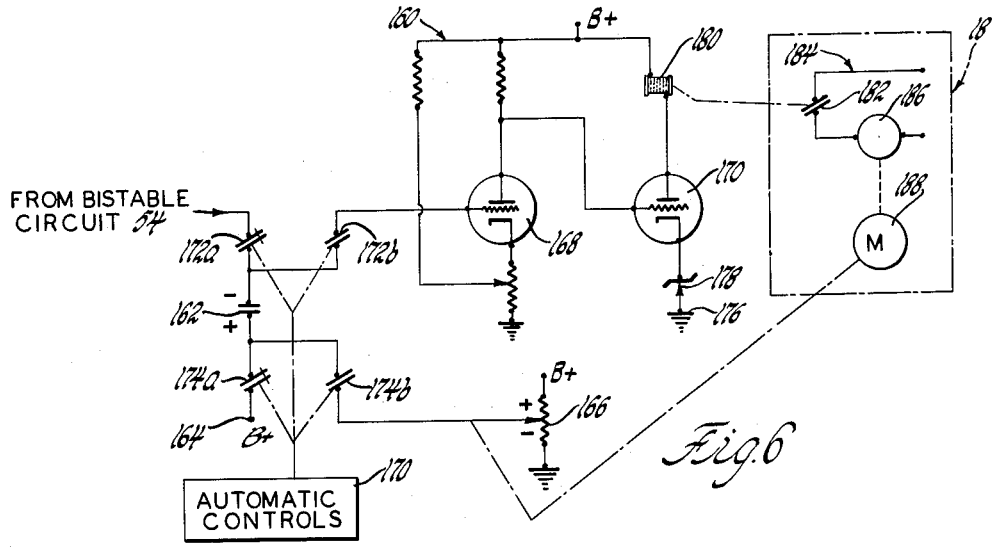
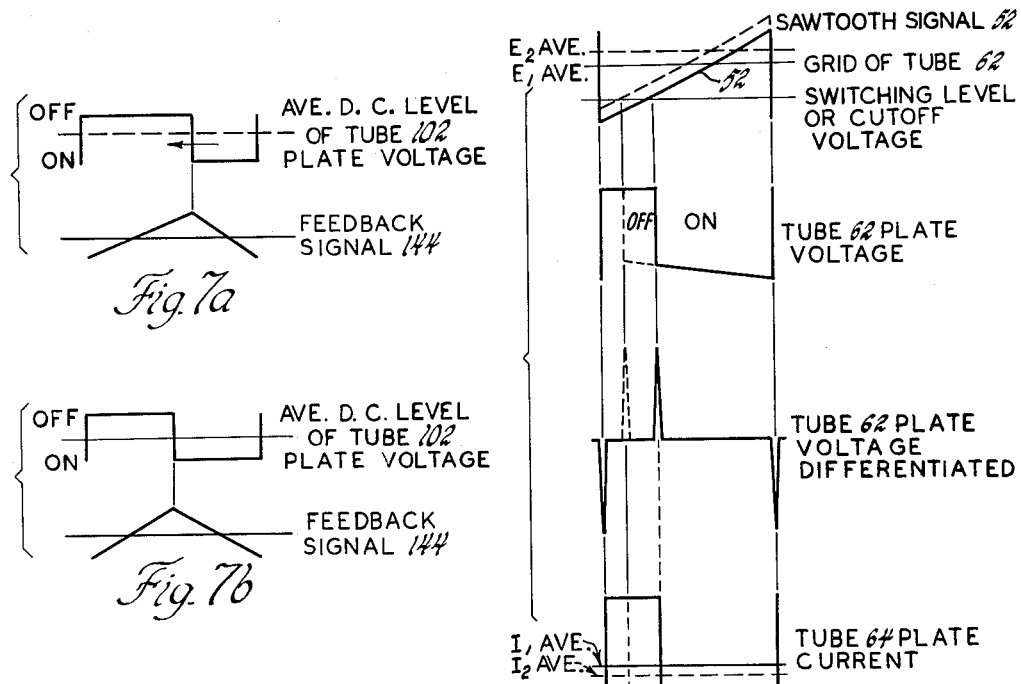
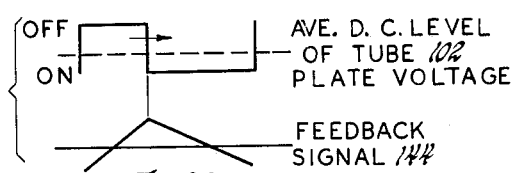

3,228,252
BALANCING SYSTEM
Philip K. Trimble, Rochester, Mich., assignor to General Motors Corporation, Detroit, Mich., a corporation of Delaware
Filed Dec. 5, 1962, Ser. No. 242,500
25 Claims. (Cl. 73—462)

This invention relates to improvements in electrical controls adapted for use, although not exclusively, in automatic balancing systems.

In the conventional servo system, a servomotor drives the arm of a potentiometer from which an output voltage is obtained. This output voltage, which corresponds to the position of the servomotor, is compared with a reference voltage. The resultant of the comparison, designated as an error voltage, is utilized for controlling the servomotor so that the output voltage from the potentiometer is varied until the error voltage is nulled or achieves some predetermined limiting value. Most of the foregoing systems are either of the mechanical or electromechanical type and lack both responsiveness because of mechanical inertias within the system and accuracy because of dead spots, e.g., when the error voltage is too small to provide enough power to the servomotor to overcome its static friction. The all electrical systems proposed usually employ relays and also can be criticized for lack of accuracy in the critical range, i.e., when a null is approached or the limiting voltage is reached. Moreover, within this critical range, the electrical relay type of control is not infinitely variable.

Because of the foregoing, a unique control is contemplated that affords extreme accuracy over a substantial range, that is very responsive, and that utilizes a minimum number of components. More particularly, it is proposed to provide a novel control that senses the output from a device to be controlled and thereafter develops a control signal for conditioning the device to operate at a predetermined output. In accomplishing this, the novel control develops an oscillating output at whatever average D.C. level is needed to condition the device for the desired output. The period of the oscillations is varied in accordance with the output from the device and a feedback loop develops a feedback signal for causing the control signal to be oscillatory so as to obtain this average D.C. level.

Another problem with which the invention is concerned is the provision of an all automatic control system for balancing apparatus. Often, the unbalance characteristics of a workpiece are measured and the proper corrections made manually. Efforts to provide an automatic system in which the unbalance characteristics are measured and this information used to make the correction have not been satisfactory because they are either not sufficiently accurate or not responsive enough for many balancing operations, or both. Moreover, these proposed automatic systems are complicated and therefore expensive both to make and to service.

Accordingly, it is proposed to provide an automatic control system for balancing apparatus that overcomes these problems and permits accurate measurement of the unbalance characteristics in a workpiece. By the unique arrangement, the phase of a reference signal and an unbalance signal are compared. Thereafter, the phase of the reference signal is shifted until a certain phase relationship exists between the two signals. When this is established, the angular location of the unbalance can be ascertained as well as the magnitude. This latter is done automatically by an electronic control that develops an output of the required magnitude for developing the predetermined phase relationship and that permits infinite variations in the output over a substantial range and as determined by the level of the input. A feedback arrangement is operative in response to the level changes to oscillate the output between the level changes so that the output control signal will be of an average D.C. level required for developing the predetermined phase relationship.

Another feature of the invention is the provision for making correction in a workpiece at only certain places. This is achieved by a novel arrangement within the control system.

The foregoing and other objects and advantages of the invention will be apparent from the following description and from the accompanying drawings in which:

FIGURE 1 is a block diagram of a balancing system incorporating the principles of the invention;

FIGURE 2 is a diagram of a bistable circuit used in the FIGURE 1 system;

FIGURE 3 is a diagram of a null sensing circuit employed by the FIGURE 1 system;

FIGURE 4 is a diagram of a clamping arrangement utilized with the FIGURE 3 null sensing circuit;

FIGURE 5 illustrates a modification to the FIGURE 4 clamping arrangement;

FIGURE 6 is a diagram of an electrostatic memory employed in the FIGURE 1 system;

FIGURES 7a, 7b, and 7c show wave forms obtained at different points in the FIGURE 3 circuit under different conditions;

FIGURE 8 illustrates wave forms developed in the FIGURE 2 circuit; and

FIGURES 9 and 10 show wave forms produced in the FIGURE 1 system during different conditions of operation.

Referring now to the drawings in detail, and initially to FIGURE 1, the system illustrated is for the purpose of measuring the dynamic unbalance in the rotating workpiece 10 and thereafter automatically making whatever corrections are necessary. The system is similar to that disclosed in U.S. Serial No. 235,380, filed November 5, 1962. Reference can therefore be made to this application for a more detailed explanation of many parts of the system. In this embodiment, a workpiece 10 is revolved by a drive motor 12 at the speed required for measuring dynamic unbalance, if any. The necessary information, then, both for angularly locating and measuring the amount of unbalance in the workpiece 10 is obtained from a pair of pickups, designated in the drawings as reference and unbalance pickups 14 and 16. This information is finally used to operate a suitable indexing mechanism 18, which properly aligns the workpiece 10 relative to a balance correction mechanism 20. The mechanism 20 then adds or subtracts material from the workpiece 10 in any well known way.

The reference pickup 14, which may be of any known type, e.g., magnetic or photoelectric, cooperates with the workpiece 10 to develop a reference signal 22 having a frequency corresponding to the rotational speed of the workpiece 10. This can be done by having the reference pickup 14 responsive to a reference point on the workpiece 10, for example a hole or a magnetic slug, so that the reference signal 22 will be developed each time this reference point passes the reference pickup 14. Thereafter, the reference signal 22 is fed to a pulse forming network denoted generally at 24 where a trigger pulse 26 is generated. The trigger pulse 26 is used to trigger a square wave generator 28, which develops a square wave control signal 30 of the same phase and frequency as the trigger pulse 26. The square wave signal 30 is increased in strength if needed by an amplifier 32 and then applied to one of the inputs of a detector or demodulator 34. The demodulator 34 may be of the kind disclosed in the U.S. patent to King 2,988,918.

The demodulator 34 is also known as a chopper relay or a synchronous rectifier and functions in the customary way to rectify a voltage in synchronism with some reference signal, in this instance the square wave control signal 30. The synchronous rectifying action affords beneficial filtering for unbalance measuring since all even harmonics are eliminated and all odd harmonics are greatly reduced.

The square wave control signal 30 is also fed to a 90° phase shifter 36 to produce a phase shifted square wave control signal 38 that too may be increased in strength if needed by an amplifier 40 and then applied to one of the inputs of a demodulator 42 similar to the demodulator 34. The purpose of the demodulator 42 will be described more in detail in the operational summary.

In the pulse forming network 24, the reference signal 22 is amplified and shaped by an amplifier and pulse shaper 44 so as to provide both a positive pulse 46 and a negative pulse 48. The positive pulse 46 trips a sawtooth generator and amplifier 50, which develops a constant amplitude sawtooth signal 52. The sawtooth signal 52 is fed to a bistable circuit 54. The bistable circuit 54, as will be explained, develops an on-off type output signal 55 of a rectangular wave form. The output signal 55 is combined with the sawtooth signal 52 in a suitable mixing circuit 56, for reasons to be explained, to develop a composite or mixed signal 57. Thereafter, the mixed signal 57 is differentiated and clipped, i.e., the negative pulse is eliminated in a pulse shaper 58 so that only the positive trigger pulse 26 is passed on to the square wave generator 28.

The trigger pulse 26 is varied, as will become more apparent, in phase or time with respect to the clipped negative pulse, which is coincident with the initial reference signal 22, by the phase shifting network comprising the sawtooth generator and amplifier 50, the bistable circuit 54, and a null sensing circuit 60, the latter circuit 60 sensing the output from the demodulator 34 and developing an output control signal, which is used to change the level of the sawtooth signal 52.

The foregoing can be best explained by considering the details of the bistable circuit 54, as illustrated in FIGURE 2, and the FIGURE 8 wave forms. The bistable circuit 54 is preferably a Schmitt trigger that comprises two three-element tubes 62 and 64 housed within a single envelope. The tubes 62 and 64 operate in a known manner, i.e., the bias voltage applied to the grid of the tube 62 will determine which of the two tubes 62 or 64 is conductive at a given time. The cathodes of the tubes 62 and 64 are both grounded at 66 by way of a common resistor 68, whereas the anodes or plates of the tubes 62 and 64 are connected to a B+ voltage source respectively through resistors 70 and 72. The plate of the tube 62 is coupled to the grid of the tube 64 through a resistor 74 and also to the input of the mixing circuit 56. Of course, the output can be taken from the plate circuit of tube 64 if needed.

As is illustrated in FIGURE 8, the sawtooth signal 52 has the $E_1$ average voltage level, which is positive relative to the indicated switching or cutoff voltage for the tube 62. The tube 62 plate voltage will have the wave form indicated in solid lines. The point of intersection of the sawtooth signal 52 and the switching level line will be the point at which the plate voltage decreases and the tube 62 becomes conductive. If the average level of the sawtooth signal 52 is increased to the $E_2$ level, which in the FIGURE 1 embodiment is done by the null sensing circuit 60 in a way to be explained, the sawtooth signal 52 will be moved up to the broken line position and intersect the switching level line sooner, thus causing the tube 62 to become conductive sooner. Therefore, the tube 62 plate voltage will have the broken line wave form illustrated. When the tube 62 plate voltage is differentiated in the pulse shaper 58, the depicted wave form will be produced. As can be now appreciated, the differentiated positive pulse can be shifted from the solid line position to the broken line position by increasing the average level of the sawtooth signal 52. In fact, provision is made for producing phase shifts in this way over a full 360° range.

The plate current of the tube 64 will appear as illustrated in FIGURE 8 since the tube 64 will only conduct when the tube 62 is nonconductive, this being determined by the resistor 74 and a grid bias resistor 76. Consequently, the average tube 64 plate current $I_1$ at the $E_1$ average sawtooth voltage level will be as shown, whereas the $I_2$ average current will be less when the sawtooth signal is at the $E_2$ average level. The decrease in the tube 64 plate current is because the tube 64 will be on for a shorter time when the sawtooth signal 52 is at the $E_2$ average level.

Considering now the unbalance pickup 16, it is arranged so as to develop an unbalance signal 78 of a sinusoidal wave form characteristic of the unbalance in the workpiece 10. Because the unbalance signal 78 is often very weak and usually includes various spurious signals from noise and other background effects, an amplifier 80 is employed to increase the unbalance signal 78 to a more useful level. The unbalance signal 78 is then supplied both to the demodulator 34 and the demodulator 42 where it is synchronously rectified respectively by the square wave control signal 30 and the phase shifted square wave control signal 38.

The difference in the phases of the unbalance signal 78 and the reference signal 22 can be used for ascertaining the angular location of the unbalance in the workpiece 10 relative to the aforementioned reference point. Therefore, merely by measuring this phase difference and converting it to an angular amount, the actual angle in degrees can be determined. This can be done by measuring the amount one signal must be shifted in phase relative to the other for the two signals to correspond in phase. Because the unbalance signal 78 is sinusoidal in wave form, and includes the many spurious signals, greater accuracy is achieved by shifting the reference signal 22 until it corresponds in phase to the unbalance signal 78. This phase shift is produced by changing the average level of the sawtooth signal 52 as has been explained. However, the amount of phase shift is established by the output from the demodulator 34.

To explain how the output from the demodulator 34 is utilized to determine the amount the trigger pulse 26 is to be shifted, it is again mentioned that the trigger pulse 26 will have the same phase and frequency as the square wave control signal 30. The reference edge of the signal 30 corresponds with that of the trigger pulse 26, thus affording an accurate reference for use by the demodulator 34. Therefore, to measure the angle of the phase shifts, the phase of the square wave control signal 30 and the phase of the unbalance signal 78 must, for practical purposes, coincide. Actually, the unbalance signal 78 and the square wave control signal 30 must be 90° out of phase at this time so that an output signal 82 will have a null average D.C. voltage level and the wave form illustrated, i.e., a sine wave reversed at each peak. The null results when the demodulator 34 synchronously rectifies or chops the sinusoidal unbalance signal 78 90° after the point of zero voltage and is achieved automatically by the operation of the null sensing circuit 60. This 90° being a fixed amount is easily compensated by proper calibration and thereafter is not a concern as will be understood by those versed in the art. To describe the null sensing circuit 60 in detail, reference is fade to FIGURE 3, where as illustrated, the null sensing circuit 60 basically comprises an amplifier stage 83, a switching circuit 84, preferably a Schmitt trigger, and a cathode follower 86. The input of the null sensing circuit 60 is as mentioned responsive to the output from the demodulator 34.

The output signal 82 is initially transferred through a filter and voltage limiter 88. Hence, the D.C. component of the output signal 82 is retained and limited to a certain level and thereafter applied to the grid of a three-element amplifier tube 90. The tube 90 has the plate thereof joined to a B+ voltage source through a plate resistor 92.

A cathode bias is utilized and this is obtained from fixed resistors 94 and 96 and a variable resistor 98.

The switching circuit 84 has two three-element tubes 100 and 102 enclosed by a single envelope. The grid of the tube 100 is coupled to the plate of the amplifier tube 90 through a neon tube 104, which affords a constant voltage drop. The cathodes of the tubes 100 and 102 are each grounded at 105 through a common resistor 106. The cathode of the tube 100 has an additional resistor 108. The plates of the tubes 100 and 102 are connected to the B+ voltage source respectively through resistors 110 and 112. In this embodiment, the plate of the tube 102 serves as the output. The bias levels of the tubes 100 and 102 are controlled respectively by a bias resistor 114 and bias resistor 116. A parallel capacitor resistor network 118 is used to couple the grid of the tube 102 to the plate of the tube 100.

The cathode follower 86 includes a three-element tube 120 that has the grid thereof connected to the plate of the switching circuit 84 through a filter 122 and a pair of neon tubes 124 and 126. The neon tubes 124 and 126 step down the voltage to the level needed and the filter 122 removes the A.C. component. The output from the cathode follower 86 is taken across a cathode resistor 128 and thereafter is applied to the input of the bistable circuit 54 to raise or lower the level of the sawtooth signal 52 in the manner previously explained.

The output from the switching circuit 84 is also fed back to the grid of the amplifier tube 90 through a feedback network designated generally at 130. The feedback network 130 includes an A.C. coupling 132 and an integrator 134. The A.C. coupling is made up of a resistor 136 and a capacitor 138 and functions to only pass the A.C. component of the feedback from the switching circuit 84. The integrator 134 comprises a capacitor 140 and a resistor 142, which together provide some predetermined time constant and result in a triangular shaped feedback signal 144. Actually, the capacitor 140, the resistor 142, and the voltage level to which it is headed, determine the rate of rise of the triangular shaped feedback signal 144, while the gain of the tube 90 and the hysteresis of the switching circuit input switching level determines its height.

The null sensing circuit 60 illustrated in FIGURE 3 also includes an end switching network 146. The end switching network 146 facilitates a full 360° range of phase shifts and is described in detail in the aforementioned application. Briefly, high end switching and low end switching neon tubes 146 and 148 are so connected relative to a B+ source and a ground connection at 150 that when the voltage at a junction 152, which is influenced by a resistor 156 and a capacitor 158, exceeds some predetermined amount, the high end switching tube 146 will conduct and the charge on the capacitor 158 will be dissipated to ground at 150 until the voltage at the junction 152 returns to some low level at which time the neon tube 146 will cut off. On the other hand, if the voltage at the junction 152 becomes too low, the potential across the low end switching neon tube 148 will become great enough to cause it to fire and the capacitor 158 will be charged by the B+ voltage source until the potential at the junction 152 is returned to some value at which the low end switching neon tube 148 will cut off. The end switching network 146 will be explained more in detail in the following operational summary.

The operation of the FIGURE 1 apparatus will now be described. The first condition to be considered is that occurring when the output signal 82 has its maximum positive value. This occurs when the trigger pulse 26 developed by the pulse forming network 24 generates a square wave control signal 30 whose reference edge rectifies the unbalance signal 78 at the point of zero voltage as illustrated in column (a) of FIGURE 9. Under these conditions, the sawtooth signal 52, for explanatory purposes, is assumed situated as shown relative to the switching level of the bistable circuit 54. The tube 62 plate voltage wave form and the mixed signal wave forms will be as illustrated. With the output signal 82 having its maximum positive value, the null sensing circuit 60 will be required to decrease the level of the sawtooth signal 52. Hence, the voltage level of the control signal from the null sensing circuit 60 will automatically be decreased.

How the level of the control signal from the null sensing circuit 60 is decreased can be best explained by referring to the wave forms in FIGURES 7a, 7b, and 7c. The positive output signal 82 from the demodulator 34, when converted to a D.C. signal by the filter and voltage limiter 88 and applied to the grid of the amplifier tube 90, causes the plate voltage of the amplifier tube 90 to decrease. Accordingly, the plate voltage of the tube 100 increases and the plate voltage of the tube 102 decreases. In effect, then, the on-time of the tube 102 will be increased. If the plate voltage of the tube 102 had the wave form depicted in FIGURE 7a and the indicated average D.C. level, the increase in the on-time of the tube 102 will result in the FIGURE 7b wave form, which as depicted has a decreased average D.C. level.

At this point, it will be appreciated that unless some provision is made, the switching circuit 84 will assume one or the other of its two levels, indicated as on and off in the FIGURE 7 wave forms. Since it is necessary to develop an output from the switching circuit 84 that will have some average level between these on-off levels, each on and off cycle for the switching circuit 84 must be repeated. This is the function of the feedback network 130. The wave form of the feedback signal 144 developed when the plate voltage of the tube 102 has the FIGURE 7a and the FIGURE 7b wave forms is illustrated just below each of the tube 102 plate voltage wave forms. Because of the triangular wave shape, the feedback signal 144 for operational purposes will always have the same D.C. level regardless of the level of the tube 102 plate voltage and therefore will not affect the on-off levels of the switching circuit 84. When the feedback signal 144 is applied to the grid of the amplifier tube 90, the tube 90 plate voltage will become oscillatory and accordingly cause the switching circuit 84 to be switched back and forth between the two on-off levels. Of course, the average D.C. level of the output will be determined by the on time of the tube 102 and this average D.C. level will correspond to whatever voltage is needed to develop a null output from the demodulator 34.

The control voltage decreased in the foregoing way will be taken off the cathode of the cathode follower 120 and when applied to the grid of the bistable circuit tube 62 will cause the sawtooth signal level to be decreased.

An additional condition is assumed so that the functions of the mixing circuit 56 and the end switching network 146 can be better understood. Since the level of the sawtooth signal 52 is decreased as illustrated in column (b) of FIGURE 9, the sawtooth signal 52 will have its top edge just below the switching level lines. Therefore, the tube 62 will be cut off, and the tube 62 plate voltage will be constant. This condition happens at the phase angle of 360°. At this time, without the mixing circuit 56, there would be no trigger pulse 26 developed for operating the square wave generator 28 unless the sawtooth signal 52 was mixed with the output from the bistable circuit 54. In effect, when the plate voltage of the tube 62 becomes constant, the mixed signal 57 will, as illustrated, have the same wave form as sawtooth signal 52. Hence, a pulse is never lost and the trigger pulse 26 developed will continue to develope the square wave control signal 30 that in this instance rectifies the unbalance signal 78 45° after the point of zero voltage. As shown at the top of column (b) of FIGURE 9, the output signal 82 still has an average D.C. level that is positive, but the sawtooth signal 52 is below the switching level so that the tube 82 will remain off and no further phase correction can be made although required. Any additional decrease in the level of the sawtooth signal 52 accomplishes nothing. This means that the voltage at the junction 152 in the end switch network 146 will decrease until the low end switching neon tube 148 fires. As a result, the capacitor 158 will be charged to a potential that causes the bias level of the tube 62 to be quickly changed and the sawtooth signal 52 switched up above the switching level line and to the dotted line position portrayed at the bottom of column (b) FIGURE 9. Now, the necessary decrease in the level of the sawtooth signal 52 can start and of course the neon tube 148 will have cut off as soon as the end switch is completed. With the new end switched position, the bottom of the sawtooth signal 52 is in the position shown at the bottom of column (c) of FIGURE 9 relative to its switching level line. The succeeding wave forms result and the square wave control signal 30 now has its reference edge so positioned that the unbalance signal 78 is rectified 90° after the point of zero voltage. This provides the required null since the average D.C. level of this output signal 82 is now zero.

The other extreme condition occurs as illustrated in column (a) of FIGURE 10 when the rectified unbalance or output signal 82 has its maximum negative D.C. average value. This happens when the unbalance signal 78 is rectified 180° after the point of zero voltage. Again, the null sensing circuit 60 will sense this change in the level of the output signal 82. When the negative output signal 82 is applied to the grid of the amplifier tube 90, the tube 90 plate voltage will increase. Of course, an increase in the plate voltage of the amplifier tube 90 causes the plate voltages of the switching circuit tubes 100 and 102 to respectively decrease and increase. Consequently, the on-time of the tube 102 will increase. This is verified by comparing the FIGURE 7b and 7c wave forms. As can be observed, the wave form in FIGURE 7c would have the average D.C. level illustrated thus corresponding to a negative output signal 82. By decreasing the on-time of the tube 102, the average D.C. level is raised to that in FIGURE 7b, which is that needed to develop a null.

Referring to FIGURE 10, by raising the level of the sawtooth signal 52, the necessary correction in the shifting of the phase of the trigger pulse 26 is initiated. To appreciate the other extreme of the end switching, i.e., the condition at the phase angle of 0°, it has been assumed that the sawtooth signal 52 is shifted upwardly to just above the switching level line so that the tube 62 now maintains its conductivity and the tube 62 plate voltage becomes constant. Again, the mixing circuit 56 continues to develop a mixed signal 57, which at this time has an undistorted sawtooth wave form and the square wave control signal 30 will cause the unbalance signal 78 to be rectified or chopped at 135° after the point of zero voltage. As can be noted in column b of FIGURE 10, the output signal 82 still has a negative average D.C. level but a further increase in the level of the sawtooth signal 52 will accomplish nothing unless end switching takes place. The end switch does occur because the voltage at the junction 152 in the end switching network 146 will increase until the high end switching neon tube 146 will become conductive. A predetermined portion of the charge on the capacitor 158 will be leaked to ground at 150, whereupon the neon tube 146 will cut off. This action will move the sawtooth signal 52 to the dotted line position in column b of FIGURE 10. Thereafter, the required increases in the average level of the sawtooth signal 52 will move the sawtooth signal 52 upwardly as indicated by the arrow in column c of FIGURE 10 and result in the wave forms shown in this column c. The square wave control signal 30 will have its reference edge shifted until the unbalance signal 78 is chopped 90° after the point of zero voltage and the output signal 82 will have the needed null average D.C. level.

Once the trigger pulse 26 has been shifted the necessary amount to develop the null output signal 82, the angular location of the unbalance and the amount of the unbalance can be ascertained. The angular location of the unbalance corresponds to the phase difference between the reference signal 22 and the unbalance signal 78. Therefore, when the trigger pulse 26 is shifted in phase until the output signal 82 from the demodulator 34 attains a null, there is a change as has been mentioned in the average plate current of the tube 64 in the bistable circuit 54. This is because the raising and lowering of the voltage level of the sawtooth signal 52 changes the on-time of the tube 64. For this reason, a suitable angle meter 159, which responds to average current flow, is installed as shown in FIGURE 2 in the plate circuit of the tube 64. The angle meter 159 is so calibrated that changes in the average current are read directly as angle changes. This same information obtained visually from the angle meter 159 can be stored in a suitable memory 160 and then when needed can cause the indexing mechanism 18 to automatically revolve the workpiece 10 the required angular amount relative to the aforementioned reference point on the workpiece 10. The balance correction can now be made.

The memory 160 can be of any suitable type but is preferably of the character illustrated in FIGURE 6. As shown, a capacitor 162, which is connected to B+ at 164, is either interconnected between the bistable circuit 54 and B+ at 164 or between a potentiometer 166 and the grid of a triode 168. This determination can be made by suitable automatic controls 170, which operate normally closed contacts 172a and 174a and normally open contacts 172b and 174b. To store the information voltage on the capacitor 162, it is necessary for the different contacts to be in the depicted position. Subsequently, when the information voltage is to be utilized, the positions of the different contacts are changed so that only contacts 172b and 174b are closed. As a consequence, the voltage on the capacitor 162 and the voltage derived from the potentiometer 166 will be in opposition and result in some voltage that is the algebraic sum of the two. This summed voltage is applied to the grid of the tube 168 and will influence the plate voltage and accordingly the operation of another three-element tube 170.

Initially, the summed voltage applied to the grid of the tube 168 is negative; hence, its plate voltage is maximum and positive. Preferably, the cathode of the tube 170 is connected to ground at 176 through a zener diode 178. The zener diode 178 permits the cathode voltage to remain at a sufficiently high positive potential so that a positive grid voltage can be used, i.e., the grid voltage can be positive but still negative relative to the cathode voltage. As a result of the applied positive voltage to the grid of the tube 170, its conductivity will be increased and a relay 180 in the plate circuit thereof will be energized. The relay 180 controls the indexing mechanism 18 by closing contacts 182 in a motor control circuit 184 therefor. Consequently, a winding 186 is energized and a motor 188 commences to revolve the workpiece 10 and simultaneously changes the setting of the potentiometer 166. When the voltage on the capacitor 162 and the potentiometer voltage are in effect balanced, the relay 180 is deenergized thus stopping the motor 188. At this point, the workpiece 10 will have been revolved relative to its reference point the angular amount indicated on the angle meter 159.

The next step is to either remove or add material to the workpiece 10 at the angular location established by the indexing mechanism 18 in the just described way. To make the correction, of course, the amount of unbalance must be known and this is the purpose of the 90° phase shifter 36, amplifier 40, and the demodulator 42. Once the output signal 82 obtained from the demodulator 34 is nulled, it is known that if the unbalance signal 78 is rectified or chopped at the point of zero voltage, the full-wave rectification will result. Therefore, at the time when the square wave control signal 30 is producing a null output signal 82 from the demodulator 34, all that is required is that the square wave control signal 30 be shifted 90° in the phase by the 90° phase shifter 36 to produce the phase shifted square wave control signal 38. When the phase shifted signal 38 is applied to the demodulator 42, the unbalance signal 78 will be full wave rectified, and an output signal 190 having a maximum D.C. level will be generated. This maximum D.C. level will correspond to the amount of unbalance in the workpiece 10. The output signal 190 at this voltage level can be visually displayed on a suitable amount meter 192 as well as fed to a memory 194 similar to the aforedescribed memory 160 except that the point 164 is grounded and thereafter utilized by the balance correction mechanism 20 for either adding or removing material from the workpiece 10 to make the necessary correction for the amount of unbalance.

Very often the workpiece 10 will be of such configuration that material can be removed or added only at certain points, e.g., it may be that a workpiece has seven blades and these are the only points at which the drilling for unbalance correction can take place. As will be appreciated, provision must be made for avoiding drilling at points between the blades as could occur with the null sensing circuit 60. This is done by a clamping circuit 196, the details of which are shown in FIGURE 4. The clamping circuit 196 includes a series of fixed contacts 198; the number, of course, will be determined by the number of points at which drilling can occur. If the drilling can occur at seven points, then preferably eight fixed contacts should be used with the first and eighth tied together. The circuit 196 also includes a movable contact 200, movement of which is preferably coordinated with the movements of the angle meter 159 in any suitable way.

To explain the operation of the clamping circuit 196, it will be assumed that the unbalance angle has been determined and the movable contact 200 is opposite one of the fixed contacts 198. After a predetermined interval adequate to permit a measurement of the angle to be made, a timer 202 will operate a relay 204 and cause a clamping solenoid winding 206 to be energized. The energization of the winding 206 causes the movable contact 200 to be moved into clamping engagement with the adjacent contact 198. It will be noted that each of contacts 198 are arranged relative to a voltage divider network 208 so that different voltages corresponding to the particular angular location of the points at which drilling can occur are furnished to the corresponding contact 198. Therefore, when the movable contact 200 engages the adjacent contact 198, a corresponding voltage is applied to the grid of the cathode follower tube 120. The relay 204 when energized also causes the normally closed contacts 204a in the grid circuit of the cathode follower tube 120 to be opened thus disconnecting the null sensing circuit 60. Now, the voltage of the control signal supplied to the bistable circuit 54 is determined by the voltage divider network 208 and accordingly an adjustment is made by the indexing mechanism 18 so that the workpiece 10 is revolved to the position dictated by the voltage from the contact 198 in engagement with the movable contact 200.

If the movable contact 200 is, however, located as shown in FIGURE 4, between two of the fixed contacts 198, provision is made for causing the indexing mechanism 18 to revolve the workpiece 10 to the position with highest voltage. Using the FIGURE 4 position as an example, current will be transferred from the B+ source primarily through a diode 210 and a resistor 216 but not through a diode 214. This is because the diode 214 is backbiased due to the arrangement of the voltage divider network 208 such that its cathode will have a higher potential than its anode. Current flow then can only take place through the diode 210 and the resistor 216 and to the grid of the cathode follower tube 120. The resistance of the resistor 216 is high relative to that of the forward conductance of the diode 210, thereby causing the grid potential on the tube 120 to be approximately that of the higher potential segment. As mentioned, the indexing mechanism 18 will make the necessary correction in the positioning of the workpiece 10 in accordance with this new voltage. In the meantime, of course, the output from the null sensing circuit 60 is not permitted to interfere due to the contacts 204a being open.

In FIGURE 5, a modification is shown in which adjacent fixed contacts 198 have a cam element 220 therebetween and the movable contact 200 is wedge shaped. If the wedge shaped movable contact 200 is in a position between the fixed contacts 198 and clamping thereafter takes place, the movable contact 200 will be forced by the cam 220 to one position or the other.

The invention is to be limited only by the following claims:

I claim:

1. In combination, switching means having an input adapted to be provided with an input signal of a certain value an output, the switching means having two output levels of operation, and feedback means sensing the output from the switching means, the feedback means including means forming an alternating feedback signal of a shape reflecting a characteristic of the output and of a constant average D.C. level for causing the switching means to oscillate between the two levels so as to cause the switching means to develop an alternating output having an average D.C. level between the two output levels and as determined by the certain value of the input signal to the switching means.

2. In combination, a control device including an input circuit adapted to be provided with an input signal of a certain value and an output circuit, a trigger circuit operatively connected to the output circuit and having two output levels of operation as determined by the output from the device, and a feedback circuit operatively connected between the output of the trigger circuit and the input circuit, the feedback circuit being responsive to the output from the trigger circuit and including means developing an alternating feedback signal in accordance with a characteristic of the output from the trigger circuit and of a constant average D.C. level for causing the trigger circuit to oscillate between the two output levels and thereby produce an output having an average D.C. level between the two levels and as determined by the certain value of the input signal to the device.

3. In combination, an amplifying device including an input circuit adapted to be provided with an input signal of a certain value and an output circuit, a trigger circuit communicating with the output circuit and arranged to develop an output signal in accordance with the output from the device, and a feedback circuit responsive to the output signal and including an integrator for developing a triangular shaped feedback signal reflecting a certain characteristic of the output signal and an A.C. coupling for interconnecting the integrator and the input circuit so as to cause the triangular shaped feedback signal to be applied to the input circuit and thereby oscillate the output from the amplifying device and accordingly cause the trigger circuit to develop an output signal of a rectangular wave shape and of an average D.C. level determined by the certain value of the input signal.

4. In a control system, the combination of a device adapted to produce an output determined by the level of a control signal supplied thereto and means sensing the output from the device and developing at the output thereof the control signal for the device of the level that will cause the device to produce a certain output, the sensing means including feedback means responsive to the control signal and operative to develop an oscillating signal in accordance with a characteristic of the control signal for feeding back to the sensing means so that the output of the sensing means will correspondingly oscillate and the control signal will be of the average level required to operate the device at the certain output.

5. In a control system, the combination of a device adapted to produce an output determined by the level of a control signal supplied thereto and means sensing the output from the device and developing at the output thereof the control signal for the device of the level that will cause the device to produce a certain output, the sensing means having either of two output levels of operation as determined by the output from the device and including feedback means responsive to the control signal and operative to develop an oscillating signal in accordance with a characteristic of the control signal for feeding back to the sensing means so as to cause the output from the sensing means to be oscillated between the two levels so that the control signal will be of the average D.C. level between the two levels required to condition the device for operation at the certain output.

6. In a control system, the combination of a device adapted to produce an output determined by the level of a control signal supplied thereto and means sensing the output from the device and developing at the output thereof the control signal for the device of the level that will cause the device to produce a certain output, the sensing means including means switching the output of the sensing means between two predetermined output levels as determined by the output from the device and feedback means responsive to the control signal and operative in response to the level changes to develop an oscillating signal for feeding back to the sensing means so as to cause the sensing means output to be correspondingly oscillated between the two levels for on-off time intervals that will cause the control signal to be of the average D.C. level required to condition the device for operation at the certain output.

7. In a control system, the combination of a device adapted to produce an output determined by the level of a control signal supplied to an input thereof and means sensing the output from the device and developing at the output thereof the control signal for the device of the level that will cause the device to produce a certain output, the sensing means including a trigger circuit operatively connected to the output of the device and having two states of operation for producing the control signal, and a feedback circuit responsive to the control signal and operative to develop therefrom a feedback signal for feeding back to the sensing means, the feedback signal being so shaped by the feedback circuit as to reflect a characteristic of the control signal and thereby cause the trigger circuit to be oscillated between the two states for on-off time intervals that will cause the control signal to be of the average D.C. level required to condition the device for operation at the certain output.

8. In a control system, the combination of a device having an input and an output determined by the level of a control signal supplied thereto and means sensing the output from the device and developing at the output thereof the control signal for the device of the level that will cause the device to operate at a certain output regardless of the input, the sensing means including a trigger circuit having two levels of output operation for producing the control signal, an amplifier having the input thereof responsive to the output from the device and the output thereof operatively connected to the trigger circuit, and a feedback circuit responsive to the control signal and operative to integrate the control signal and develop therefrom a triangular shaped feedback signal reflecting a characteristic of the control signal for feeding back to the input of the amplifier and thereby cause the trigger circuit to oscillate between the two levels for on-off time intervals that will cause the control signal to be of the average D.C. level between the two levels required to condition the device to operate at the certain output.

9. In an unbalance measuring system, the combination of means generating an unbalance signal having the characteristics of unbalance in a rotating body, means generating a reference signal having a frequency corresponding to the rotational speed of the body, means detecting the phase relationship between the reference and unbalance signals and developing a corresponding output, means shifting the phase of one of the signals in accordance with a control signal supplied thereto, and means sensing the output from the detecting means and developing at the output thereof the control signal for the phase shifting means of the level that will cause the phase shifting means to phase shift the one signal until a predetermined relationship is established between the reference and unbalance signals, the sensing means including feedback means responsive to the control signal and operative to develop an oscillating signal in accordance with a characteristic of the control signal for feeding back to the sensing means so as to cause the output of the sensing means to be oscillated so that the control signal will be of the level required to establish the predetermined relationship between the reference and unbalance signals, and means utilizing the amount the one signal is phase shifted for enabling one of the characteristics of unbalance in the body to be determined.

10. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signals and developing a corresponding output, means shifting the phase of one of the signals in accordance with a control signal supplied thereto, means sensing the output from the detecting means and developing at the output thereof the control signal for the phase shifting means of the level that will cause the phase shifting means to phase shift the one signal until the detecting means produces a certain output and accordingly a predetermined relationship is established between the reference and unbalance signals, the sensing means having either of two levels or operation determined by the output from the detecting means and including feedback means responsive to the control signal and operative to develop an oscillating signal in accordance with a characteristic of the control signal for feeding back to the sensing means so as to cause the output from the sensing means to be oscillated between the two levels so that the control signal will be of the average D.C. level required for detecting means to produce the certain output and establish the predetermined relationship between the phases of the reference and unbalance signals, and means utilizing the amount the the one signal is phase shifted for enabling one of the characteristics of unbalance in the body to be determined.

11. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signals and developing a corresponding output, means shifting the phase of one of the signals in accordance with a control signal supplied thereto, and means sensing the output from the detecting means and developing at the output thereof the control signal for the phase shifting means of the level that will cause the phase shifting means to phase shift the one signal until the detecting means produces a certain output and accordingly a predetermined relationship is established between the reference and unbalance sgnals, the sensing means including means switching the output of the sensing means between predetermined levels thereof as determined by the output from the detecting means and feedback means responsive to the control signal and operative in response to the level changes to develop an oscillating signal for feeding back to the sensing means so as to cause the sensing means output to be correspondingly oscilated between the two levels for on-off time intervals that will cause the control signal to be of the average D.C. level required for the detecting means to produce the certain output and establish the predetermined relationship between the phases of the reference and unbalance signals, and means utilizing the amount the one signal is phase shifted for enabling one of the characteristics of unbalance in the body to be determined.

12. In an unbalance measuring system, the combination of means generating an unbalance signal having the characteristics of unbalance in a rotating body, means generating a reference signal having a frequency corresponding to the rotational speed of the body, means detecting the phase relationship between the reference and unbalance signals and developing a corresponding output, means shifting the phase of one of the signals in accordance with a control signal supplied thereto, means sensing the output from the detecting means and developing the control signal for the phase shifting means of the level that will cause the phase shifting means to phase shift the one signal until the detecting means produces a certain output and accordingly a predetermined relationship is established between the reference and unbalance signals, the sensing means including a trigger circuit having two states of operation for producing the control signal, and a feedback circuit responsive to the control signal and operative to develop therefrom a feedback signal for supply to the trigger circuit, the feedback signal being so shaped by the feedback circuit as to reflect a characteristic of the control signal and thereby oscillate the trigger circuit between the two states for on-off time intervals that will cause the control signals to be of the average D.C. level required for the detecting means to produce the certain output and establish the predetermined relationship between the phases of the reference and unbalance signals, and means utilizing the amount the one signal is phase shifted for enabling one of the characteristics of unbalance in the body to be determined.

13. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signals and developing a corresponding output, means shifting the phase of one of the signals in accordance with a control signal supplied thereto, means sensing the output from the detecting means and developing the control signal for the phase shifting means of the level that will cause the phase shifting means to phase shift the one signal until the detecting means produces a certain output and accordingly a predetermined relationship is established between the phases of the reference and unbalance signals, the sensing means including a trigger circuit having two levels of operation for producing the control signal, an amplifier having the input thereof responsive to the output from the detecting means and the output thereof operatively connected to the trigger circuit, and a feedback circuit responsive to the control signal and operative to integrate the control signal and develop therefrom a triangular shaped feedback signal reflecting a characteristic of the control signal for supplying to the input of the amplifier and thereby cause the trigger circuit to oscillate between the two levels for on-off time intervals that will cause the control signal to be of the average D.C. level between the two levels required for detecting means to produce the certain output and establish the predetermined relationship between the phases of the reference and unbalance signals, and means utilizing the amount the one signal is phase shifted for enabling one of the characteristics of unbalance in the body to be determined.

14. In a control system, the combination of a device having an output determined by the magnitude of a control signal, means supplying to the device the control signal of the magnitude required to cause the device to operate at a certain output, a series of different control voltages, and means responsive to changes in the magnitude of the control signal for selecting and supplying one of the series of different control voltages closest to the required magnitude for the control signal to the device as a replacement for the control signal so that the output of the device will approximate the certain output.

15. In a control system, the combination of a device having an output determined by the magnitude of a control signal, means sensing the output from the device and developing the control signal of the magnitude required to cause the device to operate at a certain output, a series of different control voltages, and means responsive to changes in the magnitude of the control signal from the sensing means for selecting and supplying one of the series of different control voltages closest to the required magnitude for the control signal to the device as a replacement for the control signal so as to cause the output of the device to approximate the certain output.

16. In an unbalance measuring system, the combination of means generating an unbalance signal having the characteristics of unbalance in a rotating body, means generating a reference signal having a frequency corresponding to the rotational velocity of the body, means detecting the phase relationship between the reference and the unbalance signals and developing a corresponding output, means shifting the phase of one of the signals in accordance with a control voltage supplied thereto, means supplying to the phase shifting means the control voltage of the magnitude required to cause the one signal to be phase shifted by the phase shifting means until the detecting means produces a certain output and a predetermined phase relationship is established between the reference and unbalance signals, a series of different control voltages, means responsive to changes in the magnitude of the control signal for selecting and supplying one of the control voltages closest to the required magnitude for the control signal to the phase shifting means as a replacement for the control signal so as to approximate the predetermined phase relationship between the reference and unbalance signals, and means utilizing the amount the one signal is phase shifted for enabling one of the characteristics of unbalance in the body to be determined.

17. In an unbalance measuring system, the combination of means generating an unbalance signal having the characteristics of unbalance in a rotating body, means generating a reference signal having a frequency corresponding to the rotational velocity of the body, means detecting the phase relationship between the reference and unbalance signals and developing a corresponding output, means shifting the phase of one of the signals in accordance with a control signal supplied thereto, a series of different control voltages, means sensing the output from the detecting means and developing the control signal for the phase shifting means of the magnitude required to cause the one signal to be phase shifted by the phase shifting means until the detecting means produces a certain output and a predetermined phase relationship is established between the reference and unbalance signals, means responsive to changes in the magnitude of the control signal for selecting and supplying one of the series of different control voltages closest to the required magnitude for the control signal to the phase shifting means as a replacement for the control signal so as to approximate the predetermined phase relationship, and means utilizing the amount the one signal is phase shifted for enabling one of the characteristics of unbalance in the body to be determined.

18. In an unbalance measuring system, the combination of means generating an unbalance signal having the characteristics of unbalance in a rotating body, means generating a reference signal having a frequency corresponding to the rotational velocity of the body, means detecting the phase relationship between the reference and unbalance signals and developing a corresponding output, means shifting the phase of one of the signals in accordance with a control signal supplied thereto, a series of different control voltages, control means operative to develop the control signal for the phase shifting means of the magnitude required to cause the phase shifting means to shift the phase of one of the signals until the detecting means produces a certain output and a predetermined relationship is established between the reference and unbalance signals, and means responsive to changes in the magnitude of the control signal for selecting and supplying one of the series of different bias voltages closest to the required magnitude for the control signal to the phase shifting means as a replacement for the control signal so as to approximate the predetermined phase relationship, and means utilizing the amount the one signal is phase shifted for enabling one of the characteristics of unbalance in the body to be determined.

19. In combination, switching means including input and output circuits, the switching means having two levels of operation, and feedback means sensing the output from the switching means output circuit and operative to oscillate the switching means between the two levels so as to develop an output having an average D.C. level between the two levels and as determined by the level of the input to the switching means input circuit, a series of different voltages between the two levels, and means responsive to changes in the output from the switching means for selecting the one of the different voltages most closely approximating the average D.C. level as a replacement for the output from the switching means.

20. In a control system, the combination of a device having an output determined by the magnitude of a control signal supplied thereto and means sensing the output from the device and developing the control signal for the device of the magnitude that will cause the device to operate at a certain output, the sensing means including feedback means responsive to the control signal and operative to oscillate the output of the sensing means so as to cause the control signal to be of the magnitude required to operate the device at the certain output, a series of different voltages, and means responsive to changes in the magnitude of the control signal from the sensing means for selecting and supplying to the device one of the series of different voltages closest to the required magnitude for the control signal as a replacement for the control signal so as to cause the output of the device to approximate the certain output.

21. In a control system, the combination of a device having an output determined by the level of a control signal supplied thereto and means sensing the output from the device and developing the control signal for the device of the level that will cause the device to operate at a certain output, the sensing means including means switching the output of the sensing means between two predetermined levels as determined by the output from the device and feedback means responsive to the control signal and operative in response to the level changes to oscillate the sensing means output between the two levels for on-off time intervals that will cause the control signal to be of the average D.C. level required to condition the device for operation at the certain output, a series of different voltages between the two predetermined levels, and means responsive to changes in the magnitude of the control signal for selecting and supplying one of the series of voltages closest to the required average D.C. level to the device as a replacement for the control signal so as to cause the certain output to be approximated.

22. In a control system, the combination of a device having an output determined by the level of a control signal supplied thereto and means sensing the output from the device and developing at the output thereof the control signal for the device of the level that will cause the device to operate at a certain output, the sensing means including a trigger circuit having two levels of operation for producing the control signal, an amplifier having the input responsive to the output from the device and the output operatively connected to the trigger circuit, and a feedback circuit responsive to the control signal and operative to integrate the control signal and develop therefrom a triangular shaped feedback signal reflecting a characteristic of the control signal for supplying to the input of the amplifier and thereby cause the trigger circuit to oscillate between the two levels for on-off time intervals that will cause the control signal to be of the average D.C. level between the two levels required to condition the device to operate at the certain voltage, a series of different voltages between the two levels, and means responsive to changes in the magnitude of the control signal for selecting and supplying one of the series of different voltages closest to the required average D.C. level to the device as a replacement for the control signal so as to cause the certain output to be approximated.

23. In an unbalance measuring system, the combination of means generating an unbalance signal having the characteristic of unbalance in a rotating body, means generating a reference signal having a frequency corresponding to the rotational speed of the body, means detecting the phase relationship between the reference and unbalance signals and developing a corresponding output, means shifting the phase of one of the signals in accordance with a control signal supplied thereto, means sensing the output from the detecting means and developing the control signal for the phase shifting means of the level that will cause the phase shifting means to phase shift the one signal until a predetermined phase relationship is established between the reference and unbalance signals, the sensing means including feedback means responsive to the control signal and operative to oscillate the output from the sensing means in accordance with a characteristic of the control signal so as to cause the control signal to be of the level required to establish the predetermined phase relationship between the reference and unbalance signals, a series of different voltages, means responsive to changes in the magnitude of the control signal for selecting and supplying one of the series of different voltages closest to the required level of the control signal to the phase shifting means as a replacement for the control signal so as to cause the predetermined phase relationship to be approximated, and means utilizing the amount the one signal is phase shifted for enabling one of the characteristics of unbalance in the body to be determined.

24. In an unbalance measuring system, the combination of means generating an unbalance signal having the characteristics of unbalance in a rotating body, means generating a reference signal having a frequency corresponding to the rotational speed of the body, means detecting the phase relationship between the reference and unbalance signals and developing a corresponding output, means shifting the phase of one of the signals in accordance with a control signal supplied thereto, means sensing the output from the detecting means and developing the control signal for the phase shifting means of the level that will cause the phase shifting means to phase shift the one signal until a predetermined relationship is established between the reference and unbalance signals, the sensing means including means switching the output of the sensing means between two predetermined levels thereof as determined by the output from the detecting means and feedback means responsive to the control signal and operative in response to the level changes to oscillate the sensing means output between the two levels for on-off time intervals that will cause the control signal to be of the average D.C. level required by the phase shifting means to establish the predetermined relationship between the phases of the reference and unbalance signals, a series of different voltages between the two predetermined levels, means responsive to changes in the magnitude of the control signal for selecting and supplying one of the series of different voltages closest to the required average D.C. level of the control signal to the phase shifting means as a replacement for the control signal so as to cause the predetermined phase relationship to be approximated, and means utilizing the amount the one signal is phase shifted for enabling one of the characteristics of unbalance in the body to be determined.

25. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signals and developing a corresponding output, means shifting the phase of one of the signals in accordance with a control signal supplied thereto, means sensing the output from the detecting means and developing the control signal for the phase shifting means of the level that causes the phase shifting means to phase shift the one signal until a predetermined relationship is established between the phases of the reference and unbalance signals, the sensing means including a trigger circuit having two levels of operation for producing the control signal, an amplifier having the input thereof responsive to the output from the detecting means and the output thereof operatively connected to the trigger circuit, and a feedback circuit responsive to the control signal and operative to integrate the control signal and develop therefrom a triangular shaped feedback signal reflecting a characteristic of the control signal for supplying to the input of the amplifier and thereby cause the trigger circuit to oscillate between the two levels for on-off time intervals that will cause the control signal to be of the average D.C. level between the two levels required for the phase shifting means to establish the predetermined phase relationship between the reference and unbalance signals, a series of different voltages between the two levels, and means responsive to changes in the magnitude of the control signal for selecting and supplying one of the series of different voltages closest to approximating the required average D.C. level of the control signal to the phase shifting means as a replacement for the control signal so as to cause the predetermined phase relationship to be approximated, and means utilizing the amount the one signal is phase shifted for enabling one of the characteristics of unbalance in the body to be determined.

References Cited by the Examiner
UNITED STATES PATENTS

| | | | |
|---|---|---|---|
| 1,386,915 | 8/1921 | Underhill | 73—518 |
| 2,452,764 | 11/1948 | Kirwan | 200—56 |
| 2,673,331 | 3/1954 | Liguori | 332—14 |
| 2,861,140 | 11/1958 | Woodall | 340—266 |
| 2,935,311 | 5/1960 | Kabelitz | 73—507 |
| 2,940,306 | 6/1960 | Lozier | 73—517 |
| 2,947,172 | 8/1960 | King | 73—462 |
| 3,037,403 | 6/1962 | Hack | 73—463 |
| 3,039,063 | 6/1962 | Blumenfeld et al. | 324—78 |
| 3,062,059 | 11/1962 | Singleton | 73—517 |

RICHARD C. QUEISSER, *Primary Examiner.*

JAMES J. GILL, *Examiner.*